United States Patent
Cerri, III et al.

(10) Patent No.: US 12,234,876 B2
(45) Date of Patent: Feb. 25, 2025

(54) OPTIMIZED MASS CAST BAR PIN FOR BUSHING ASSEMBLY

(71) Applicant: The Pullman Company, Milan, OH (US)

(72) Inventors: Joseph F Cerri, III, Norwalk, OH (US); Zoren E. Gaspar, Huron, OH (US)

(73) Assignee: The Pullman Company, Milan, OH (US)

( * ) Notice: Subject to any disclaimer, the term of this patent is extended or adjusted under 35 U.S.C. 154(b) by 81 days.

(21) Appl. No.: 17/557,582

(22) Filed: Dec. 21, 2021

(65) Prior Publication Data

US 2023/0193972 A1 Jun. 22, 2023

(51) Int. Cl.
*F16F 1/38* (2006.01)

(52) U.S. Cl.
CPC ........ *F16F 1/3863* (2013.01); *B60G 2204/41* (2013.01)

(58) Field of Classification Search
CPC .. F16F 13/14; F16F 1/38; F16F 1/3863; F16F 15/08; F16F 1/3835; F16F 1/025; F16F 13/28; F16F 2234/02; F16F 9/486; F16F 2226/045; B60G 2204/41; B60G 2204/4104; B60G 2204/1222; B60G 11/12; B60G 2206/427; B60G 2202/135; B60G 2204/4404; B60G 21/055; B60G 2202/134; B60G 2204/41046; B60G 7/02; B60G 2206/012

See application file for complete search history.

(56) References Cited

U.S. PATENT DOCUMENTS

| 3,155,405 A | 11/1964 | Cadovius |
| 3,873,220 A | 3/1975 | Kashiwabara |
| 4,023,913 A | 5/1977 | Berkowitz |

(Continued)

FOREIGN PATENT DOCUMENTS

| DE | 102011116334 A1 | 4/2013 |
| DE | 102014223534 A1 | 5/2016 |

(Continued)

OTHER PUBLICATIONS

CN 112901718 A (Year: 2021).*

(Continued)

*Primary Examiner* — Robert A. Siconolfi
*Assistant Examiner* — Mahbubur Rashid
(74) *Attorney, Agent, or Firm* — Harness, Dickey & Pierce, P.L.C.

(57) ABSTRACT

The present disclosure provides a bushing assembly. The bushing assembly includes an inner sleeve, an outer sleeve, an elastomer, and a bar pin. The elastomer is disposed between the inner sleeve and the outer sleeve. The bar pin includes a first end, a second end, and a central portion between the first end and the second end. The central portion extends along a longitudinal axis. The central portion has a cruciform cross-section perpendicular to the longitudinal axis. The bar pin further includes a first intermediate portion between the central portion and the first end. The first intermediate portion has an uninterrupted circular cross-section perpendicular to the longitudinal axis. The inner sleeve circumscribes the central portion of the bar pin.

17 Claims, 4 Drawing Sheets

(56) References Cited

U.S. PATENT DOCUMENTS

| | | | |
|---|---|---|---|
| 4,076,429 A | 2/1978 | Berkowitz | |
| 4,106,877 A | 8/1978 | Ferguson | |
| 4,111,577 A | 9/1978 | Kiyosawa | |
| 4,809,960 A * | 3/1989 | Kakimoto | F16F 1/38 403/228 |
| 5,788,265 A | 8/1998 | McLaughlin | |
| 6,854,723 B2 * | 2/2005 | Ogawa | F16F 1/3842 267/141.5 |
| 7,506,862 B2 * | 3/2009 | Siemer | B60G 7/02 267/293 |
| 8,037,573 B2 * | 10/2011 | Bost, Jr. | B60G 3/20 16/2.2 |
| 8,192,106 B2 * | 6/2012 | Vogler | F16F 1/3842 403/372 |
| 8,434,749 B2 * | 5/2013 | Rogge | F16F 1/3863 267/281 |
| 8,579,510 B2 * | 11/2013 | Noble | F16F 1/3842 384/129 |
| 8,973,909 B2 * | 3/2015 | Noble | B60G 9/00 267/293 |
| 10,408,293 B2 * | 9/2019 | Kondor | B60G 7/02 |
| 10,767,721 B2 * | 9/2020 | Zimmerman | B21D 53/88 |
| 2002/0141669 A1 * | 10/2002 | Testroet | F16F 1/3842 384/222 |
| 2006/0231993 A1 * | 10/2006 | Collyer | F16F 1/3863 267/293 |
| 2009/0060640 A1 | 3/2009 | Vogler et al. | |
| 2012/0231088 A1 * | 9/2012 | Bayerl | A61P 11/02 424/600 |
| 2012/0326368 A1 * | 12/2012 | Makino | F16F 1/3863 29/436 |
| 2018/0112733 A1 * | 4/2018 | Kondor | B60G 7/02 |
| 2021/0231187 A1 * | 7/2021 | Schemer | F16F 1/3842 |

FOREIGN PATENT DOCUMENTS

| | | | | |
|---|---|---|---|---|
| EP | 3221610 B1 * | 4/2019 | | F16F 1/3863 |
| JP | 2003294084 A | 10/2003 | | |
| WO | WO-20040055406 A1 | 7/2004 | | |

OTHER PUBLICATIONS

DE 102017219373 A1 (Year: 2019).*
Extended European Search Report regarding Patent Application No. 22212784.7, dated Jun. 22, 2023.

* cited by examiner

OPTIMIZED MASS CAST BAR PIN FOR BUSHING ASSEMBLY

FIELD

The present disclosure relates to an optimized mass cast bar pin and a bushing assembly including the optimized mass cast bar pin.

BACKGROUND

This section provides background information related to the present disclosure which is not necessarily prior art.

Applications for an elastomeric bushing assembly include, but are not limited to, torsion bars, linear torque rods, V-shaped torque rods, leaf springs, independent suspension control arms and other suspension control devices. These and other applications are used on a wide variety of vehicles such as automobiles, trucks, buses, off-highway vehicles, rail cars and other transportation applications.

Elastomeric bushing assemblies typically include an outer metal, an inner metal and an elastomeric bushing disposed between the outer metal and the inner metal. The outer metal can be a tubular member which is a part of the component that incorporates the elastomeric bushing assemblies or the outer metal can be a separate tubular member that is designed to be assembled to the component that incorporates the elastomeric bushing assembly by being press fit or otherwise attached to the component.

The inner metal is typically a solid tubular member which is adapted to be secured to the vehicle and/or suspension member of the application which includes the component that incorporates the elastomeric bushing assembly. One example of an inner metal is a bar pin that has a cylindrical center section and a end section disposed at both ends of the center section. The end sections extend out from the center section and may include an aperture, groove, or other feature that is used to secure the elastomeric bushing assembly to the vehicle and/or the suspension member of the application.

SUMMARY

This section provides a general summary of the disclosure, and is not a comprehensive disclosure of its full scope or all of its features.

The present disclosure provides a bushing assembly. The bushing assembly includes an inner sleeve, an outer sleeve, an elastomer, and a bar pin. The elastomer is disposed between the inner sleeve and the outer sleeve. The bar pin includes a first end, a second end, and a central portion between the first end and the second end. The central portion extends along a longitudinal axis. The central portion has a cruciform cross-section perpendicular to the longitudinal axis. The bar pin further includes a first intermediate portion between the central portion and the first end. The first intermediate portion has an uninterrupted circular cross-section perpendicular to the longitudinal axis. The inner sleeve circumscribes the central portion of the bar pin.

In some configurations, the bar pin further includes a second intermediate portion between the central portion and the second end. The second intermediate portion has an uninterrupted circular cross section perpendicular to the longitudinal axis.

In some configurations, a first diameter of the central portion is the same as a second diameter of the first intermediate portion.

In some configurations, the inner sleeve includes an inner surface in direct engagement with the central portion of the bar pin.

In some configurations, the bar pin is press fit into the inner sleeve.

In some configurations, a periphery of the central portion defines an interrupted circle.

In some configurations, the cruciform cross-section defines a diameter. A first area of the cruciform cross section ranges from 25% to 50% of a second area of a circle having the diameter.

The first area ranges from 30% to 40% of the second area.

In some configurations, the bar pin comprises austempered ductile cast iron.

In some configurations, the bar pin further includes a radially-extending flange between the second intermediate portion and the second end.

In some configurations, the radially-extending flange includes a first side adjacent to the first intermediate portion. The first side being perpendicular to the longitudinal axis.

In some configurations, a periphery of the radially-extending flange defines a plurality of depressions.

In some configurations, the bar pin further includes a first flat portion and a second flat portion. The first flat portion is between the first end the first intermediate portion. The second flat portion is between the second end and the central portion.

In some configurations, the bar pin comprises a pair of fillets between the first flat portion and the first intermediate portion.

In some configurations, the first flat portion defines a first aperture and the second flat portion defines a second aperture.

In some configurations, the first flat portion and the second flat portion are coplanar.

In some configurations, the bushing assembly further includes an intermediate sleeve. The intermediate sleeve is between the inner sleeve and the outer sleeve. The elastomer includes a first elastomer and a second elastomer. The first elastomer is between the outer sleeve and the intermediate sleeve. The second elastomer is between the inner sleeve and the intermediate sleeve.

The present disclosure provides a method of manufacturing a bushing assembly. The method includes casting a bar pin. The bar pin includes a first end, a second end, and a central portion between the first end and the second end. The central portion extends along a longitudinal axis. The central portion has a cruciform cross-section perpendicular to the longitudinal axis. The bar pin further includes a first intermediate portion between the central portion and the first end. The first intermediate portion has an uninterrupted circular cross-section perpendicular to the longitudinal axis. The method further includes press-fitting the bar pin into a bushing. The bushing includes an inner sleeve, an outer sleeve, and an elastomer disposed between the inner sleeve and the outer sleeve. The inner sleeve circumscribes the central portion of the bar pin.

In some configurations, the method further includes machining the central portion.

In some configurations, casting the bar pin includes casting the bar pin from austempered ductile cast iron.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
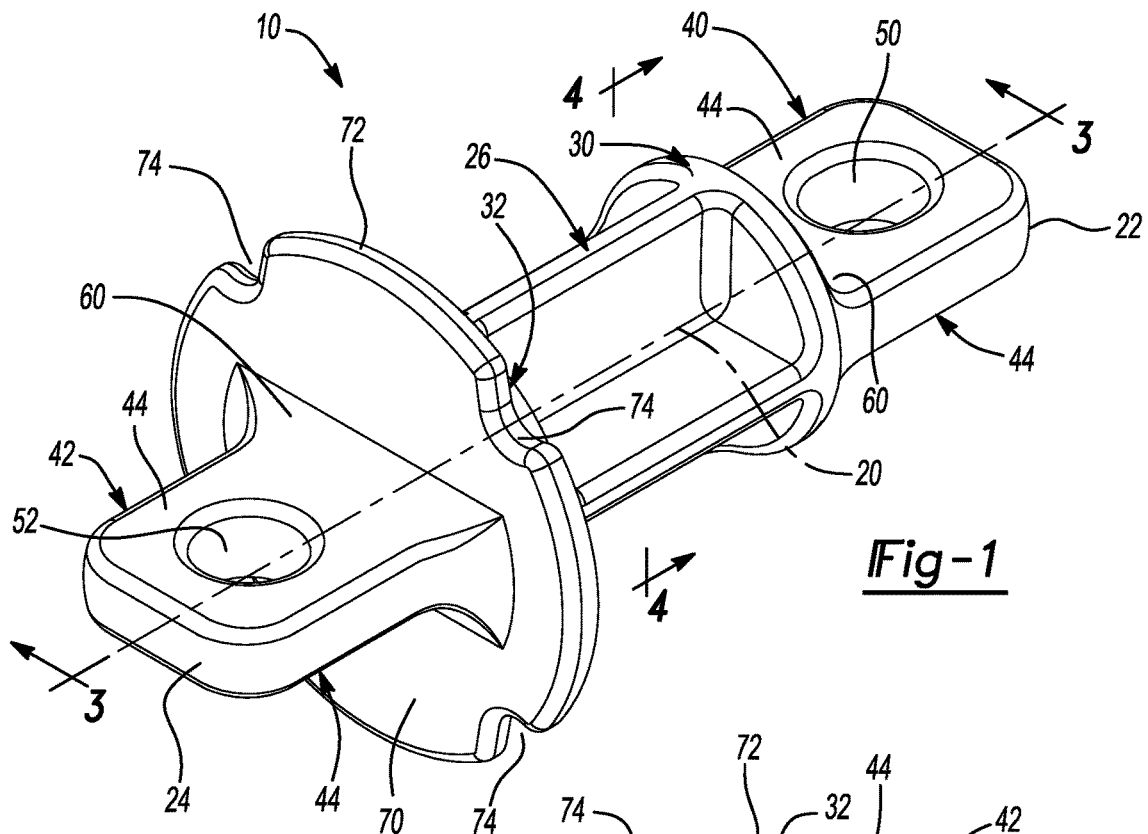
FIG. 1 is a perspective view of a bar pin according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
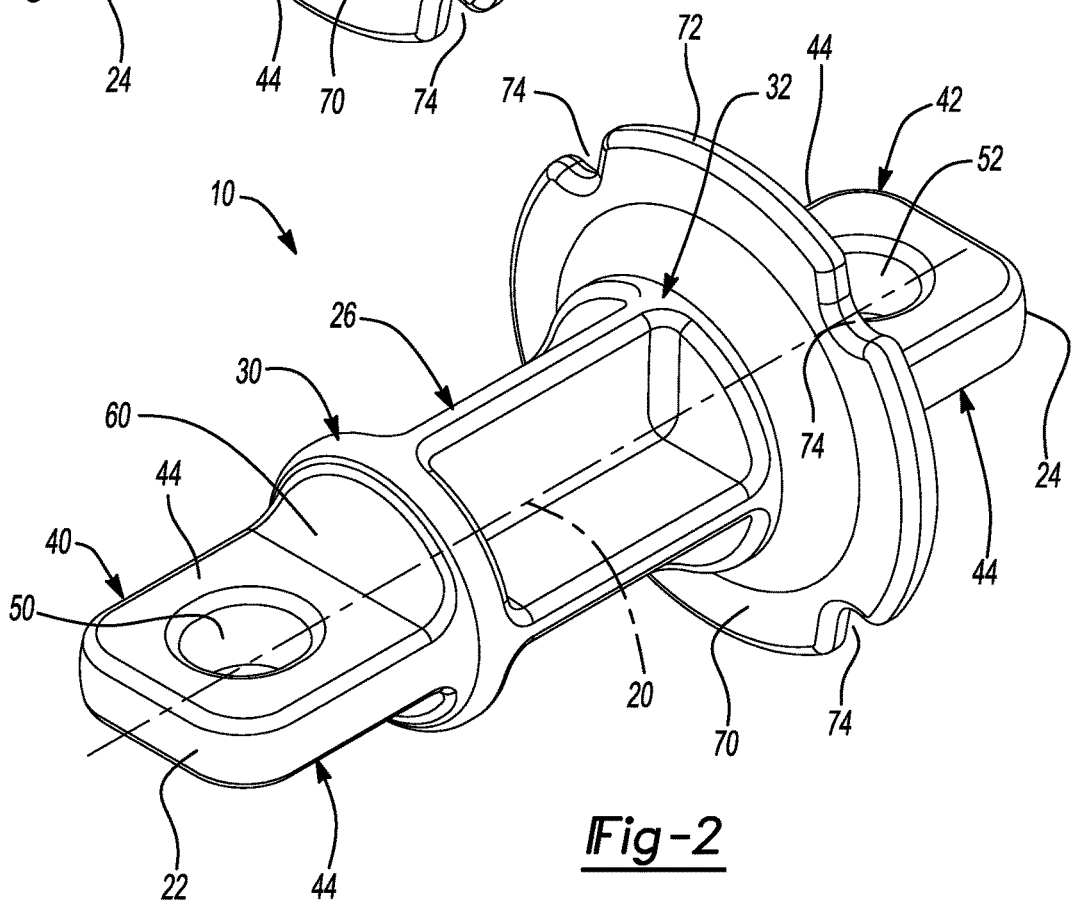
FIG. 2 is another perspective view of the bar pin illustrated in FIG. 1.

With reference to FIGS. 1-2, a bar pin 10 according to the present teachings is provided. The bar pin 10 may be adapted for use with a bushing to form a bushing assembly, as will be described below (see discussion accompanying FIGS. 5-6). The bar pin 10 may have a single-piece, unitary structure. In some embodiments, the bar pin 10 may be constructed from austempered ductile cast iron.

The bar pin 10 extends along a longitudinal axis 20 between a first end 22 and a second end 24. The bar pin 10 includes a central portion 26 between the first end 22 and the second end 24. The central portion 26 includes a cruciform cross section perpendicular to the longitudinal axis 20, as will be described in greater detail below (see discussion accompanying FIG. 4). In some embodiments, the central portion 26 has a constant diameter along the longitudinal axis 20, as shown.

The bar pin 10 further includes a first intermediate portion 30 and a second intermediate portion 32. The first intermediate portion 30 is disposed between the first end 22 and the central portion 26. The second intermediate portion 32 is disposed between the second end 24 and the central portion 26. Each of the first and second intermediate portions 30, 32 defines an uninterrupted circular cross section parallel to the longitudinal axis 12.

The bar pin 10 further includes a first flat portion 40 and a second flat portion 42. The first flat portion 40 is disposed between the first end 22 and the first intermediate portion 30. The second flat portion 42 is disposed between the second end 24 and the second intermediate portion 32. Each of the first and second flat portions 40, 42 has a rectangular cross section perpendicular to the longitudinal axis 12. As used herein, "flat portion" means a region having opposed, planar, parallel surfaces 44. In some embodiments, the first and second flat portions 40, 42 may be coplanar such that they are disposed at a common angular position about the longitudinal axis and the surfaces 44 are all parallel to one another, as shown.

In some embodiments, the first flat portion 40 defines a first aperture 50 and the second flat portion 42 defines a second aperture 52, as shown. The first and second apertures 50, 52 may be used for securing the bar pin 10 (together with a bushing) to a vehicle. In other embodiments, a bar pin may include different or additional features for securing the bar pin to a vehicle, such as cylindrical end portions defining respective annular grooves.

The bar pin 10 may further include fillets 60. A pair of the fillets 60 may connect each of the first and second intermediate portions 60, 62 to a respective pair of the surfaces 44 of the first and second flat portions 40, 42.

The bar pin 10 may further include a radially-extending flange 70 (also referred to as the "flange 70"). The flange 70 may extend radially beyond the central portion 26 and the first and second intermediate portions 30, 32. In some embodiments, the flange 70 may be disposed between the second intermediate portion 32 and the second flat portion 42, as shown. In other embodiments, a flange may alternatively be disposed between a first intermediate portion and a second flat portion.

A periphery 72 of the flange may define a plurality of depressions 74. Each of the depressions 74 may define an arced or partially circular shape. In some embodiments, the plurality of depressions 74 may include four depressions, as shown. The depressions 74 may be equally spaced about the periphery 72.

Figure 3:
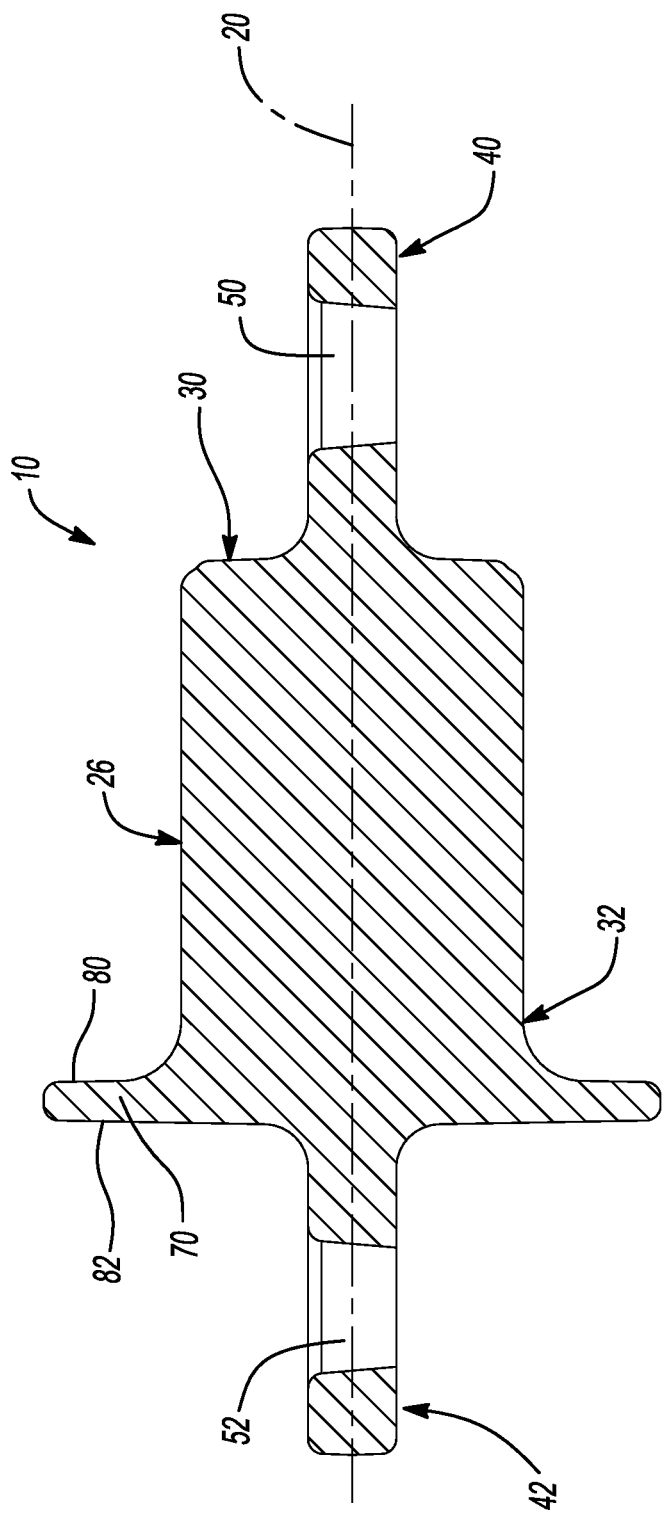
FIG. 3 is a cross-sectional view of the bar pin illustrated in FIG. 1, taken at line 3-3 of FIG. 1.

Referring to FIG. 3, The flange 70 may include a first flange surface 80 and a second flange surface 82. At least a portion of the first flange surface 80 may be planar and extend perpendicular to the longitudinal axis 20. At least a portion of the second surface 82 may form an oblique angle with respect to the longitudinal axis 20. The first and second intermediate portions 30, 20 may each extend perpendicular to the longitudinal axis 20.

Figure 4:
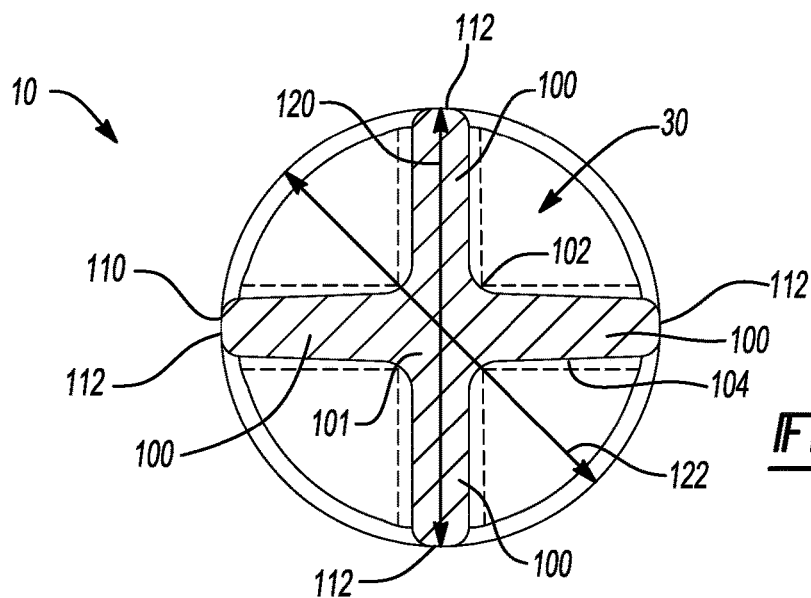
FIG. 4 is a cross-sectional view of the bar pin illustrated in FIG. 1, taken at line 4-4 of FIG. 1.

With reference to FIG. 4, as discussed above, the central portion 26 defines a cruciform cross section parallel to the longitudinal axis 20 (FIG. 3). The cruciform cross section reduces mass of the central portion 26 compared to a bar pin having a circular cylindrical central portion, while maintaining structural integrity of the central portion 26. The central portion 26 may include four spokes 100 that extend radially outwardly from a central hub 101. Each of the spokes 100 may be spaced 90° for the adjacent spokes 100. Each of the spokes 100 may be connected to adjacent spokes 100 by longitudinal fillets 102. The central portion 26 may be connected to the respective first and second intermediate portions 30, 32 by transverse fillets 104.

A periphery 110 of the central portion 26 may define an interrupted circle. Accordingly, outer surfaces 112 of each of the spokes 100 may be rounded. The central portion 26 defines a first diameter 120. The first and second intermediate portions 30, 32 define a second diameter 122. The first and second diameters 120, 122 may be the same.

An area of the central portion 26 perpendicular to the longitudinal axis 20 (FIG. 3) may be greater than about 20%, optionally greater than about 25%, optionally greater than about 30%, optionally greater than about 35%, optionally greater than about 40%, optionally greater than about 45%, optionally greater than about 50%, optionally greater than about 55%, optionally greater than about 60%, or optionally greater than about 65% of an area of a circle having the first diameter 120. The area may be less than or equal to about 70%, optionally less than or equal to about 65%, optionally less than or equal to about 60%, optionally less than or equal to about 55%, optionally less than or equal to about 50%, optionally less than or equal to about 45%, optionally less than or equal to about 40%, optionally less than or equal to about 35%, optionally less than or equal to about 25%, or optionally less than or equal to about 20% of the area of the circle having the first diameter 120. For example, the area may range from 25% to 50%, or optionally 30% to 40% of the area of the circle having the first diameter 120.

The bar pin 10 has a reduced weight compared to a bar pin having a cylindrical central portion. For example, the weight reduction may be greater than or equal to about 10%, optionally greater than or equal to about 15%, optionally greater than or equal to about 20%, optionally greater than or equal to about 25%, optionally greater than or equal to about 30%, optionally greater than or equal to about 35%, optionally greater than or equal to about 40%, or optionally greater than or equal to about 45% compared to the bar pin having the cylindrical central portion. The weight reduction may be less than or equal to about 50%, optionally less than or equal to about 45%, optionally less than or equal to about 40%, optionally less than or equal to about 35%, optionally less than or equal to about 30%, optionally less than or equal to about 25%, optionally less than or equal to about 20%, or optionally less than or equal to about 15% compared to the bar pin having the circular central portion.

Figure 5:
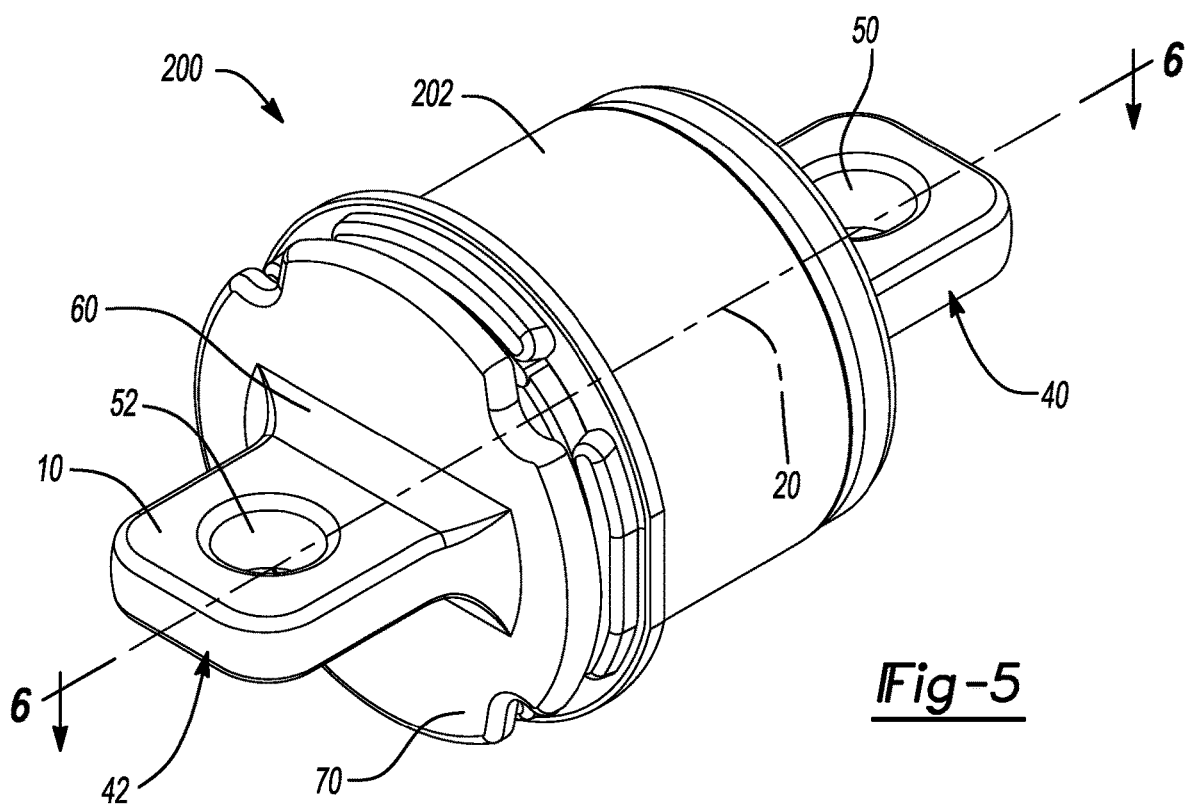
FIG. 5 is a perspective view of a bushing assembly according to the principles of the present disclosure, the bushing assembly including the bar pin illustrated in FIG. 1.

Referring to FIG. 5, a bushing assembly 200 according to the principles of the present disclosure is provided. The bushing assembly 200 includes the bar pin 10 and a bushing 202. The bar pin 10 is press fit into the bushing 202.

Figure 6:
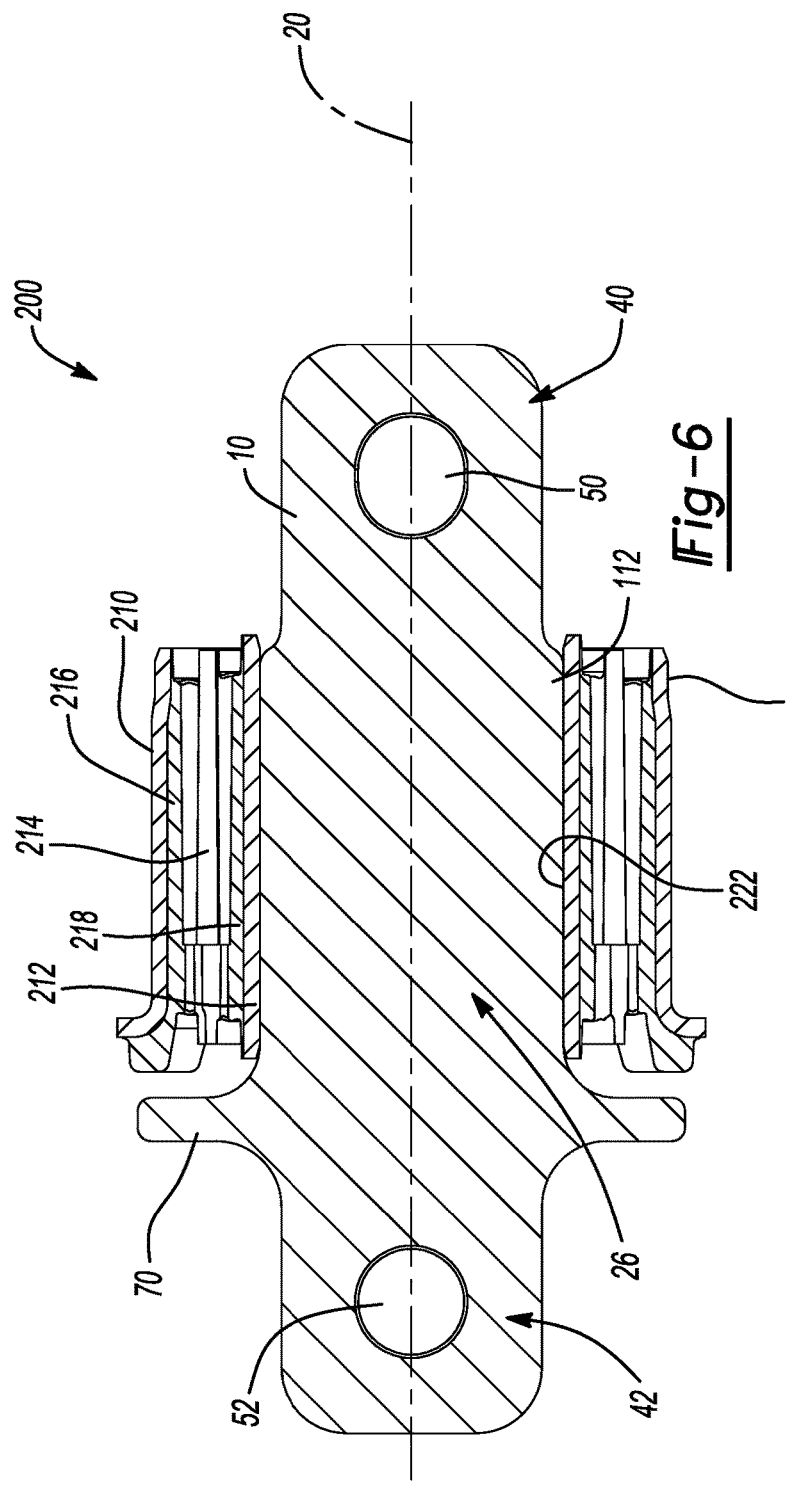
FIG. 6 is a cross-sectional view of the bushing assembly illustrated in FIG. 5, taken at line 6-6 of FIG. 5.

With reference to FIG. 6, the bushing 202 includes an outer sleeve or tube 210 and an inner sleeve or tube 212. The outer and inner sleeves 210, 212 may be constructed from metal, such as steel, by way of example. In some embodiments, the bushing 202 further includes an intermediate sleeve or tube 214, as shown. However, in other embodiments, the intermediate sleeve 214 is omitted. The bushing 202 further includes a first elastomer 216 disposed between the outer sleeve 210 and the intermediate sleeve 214 and a second elastomer 218 disposed between the inner sleeve 212 and the intermediate sleeve 214. In embodiments omitting the intermediate sleeve 214, a single elastomer may be disposed directly between the outer sleeve 210 and the inner sleeve 212.

The inner sleeve 212 defines an interior region into which the bar pin 10 is disposed. The inner sleeve 212 circumscribes the central portion 26 of the bar pin 10. An inner surface 222 of the inner sleeve 212 in in direct engagement with the outer surface 112 of the central portion 26 of the bar pin 10. The flange 70 is adapted to act as a travel limiter that sets a maximum amount of travel along the longitudinal axis 20 that may occur between the outer sleeve 210 and the bar pin 10.

Figure 7:
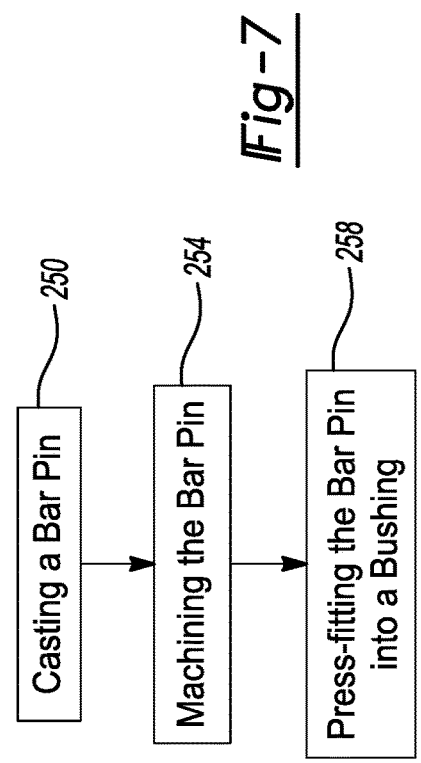
FIG. 7 is a flowchart illustrating a method of manufacturing the bushing assembly illustrated in FIG. 5 according to the principles of the present disclosure.

Referring to FIG. 7, a method of manufacturing and assembling the bushing assembly 200 according to the present teachings is provided. The method generally includes casting the bar pin 10 (FIG. 5) at 250; machining the bar pin 10 at 254; and press-fitting the bar pin 10 into the bushing 202 (FIG. 5) at 258. At 250, the bar pin 10 may be cast as a single-piece, unitary structure, including the cruciform cross section. In some embodiments, the bar pin 10 may be cast from austempered ductile cast iron. In other embodiments, the bar pin 10 may be formed by other methods, such as forming from a billet material and subsequently machining. At 254, the bar pin 10 may undergo a minor machining operation to facilitate a dimensionally-accurate press fit between the bar pin 10 and the bushing 202 at 258.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A bushing assembly comprising:
a metal inner sleeve;
an outer sleeve;
an elastomer disposed between the inner sleeve and the outer sleeve and including a bumper; and
a bar pin including a first end, a second end, and a central portion between the first end and the second end, the central portion extending along a longitudinal axis and having a cruciform cross-section perpendicular to the longitudinal axis, the bar pin further including a first intermediate portion between the central portion and the first end, the first intermediate portion having an uninterrupted circular cross-section perpendicular to the longitudinal axis, wherein the inner sleeve circumscribes the central portion of the bar pin, the bar pin further including a radially-extending flange, wherein the flange is proximate to and longitudinally spaced apart from the bumper, wherein the bar pin further includes a second intermediate portion between the central portion and the second end, the second intermediate portion having an uninterrupted circular cross section perpendicular to the longitudinal axis, wherein a first diameter of the central portion at a longitudinal midpoint of the bar pin is the same as a second diameter of the first intermediate portion, wherein the bar pin further includes a first flat portion between the first end and the first intermediate portion and a second flat portion between the second end and the central portion.

2. The bushing assembly of claim 1, wherein the inner sleeve includes an inner surface in direct engagement with the central portion of the bar pin.

3. The bushing assembly of claim 1, wherein the bar pin is press fit into the inner sleeve.

4. The bushing assembly of claim 1, wherein a periphery of the central portion defines an interrupted circle.

5. The bushing assembly of claim 1, wherein the cruciform cross-section defines a diameter and a first area of the cruciform cross section ranges from 25% to 50% of a second area of a circle having the diameter.

6. The bushing assembly of claim 5, wherein the first area ranges from 30% to 40% of the second area.

7. The bushing assembly of claim 1, wherein the bar pin comprises austempered ductile cast iron.

8. The bushing assembly of claim 1, wherein the radially-extending flange is positioned between the second intermediate portion and the second end.

9. The bushing assembly of claim 8, wherein the radially-extending flange includes a first side adjacent to the second intermediate portion, the first side being perpendicular to the longitudinal axis.

10. The bushing assembly of claim 8, wherein a periphery of the radially-extending flange defines a plurality of depressions.

11. The bushing assembly of claim 1, wherein the bar pin comprises a pair of fillets between the first flat portion and the first intermediate portion.

12. The bushing assembly of claim 1, wherein the first flat portion defines a first aperture and the second flat portion defines a second aperture.

13. The bushing assembly of claim 1, wherein the first flat portion and the second flat portion are coplanar.

14. The bushing assembly of claim 1, further comprising an intermediate sleeve between the inner sleeve and the outer sleeve, wherein the elastomer includes a first elastomer between the outer sleeve and the intermediate sleeve and a second elastomer between the inner sleeve and the intermediate sleeve.

15. A method of manufacturing a bushing assembly comprising:
casting a bar pin, the bar pin including a first end, a second end, a radially-extending flange and a central portion between the first end and the second end, the central portion extending along a longitudinal axis and having a cruciform cross-section perpendicular to the longitudinal axis, the bar pin further including a first intermediate portion between the central portion and the first end, the first intermediate portion having an uninterrupted circular cross-section perpendicular to the longitudinal axis, wherein the bar pin further includes a second intermediate portion between the central portion and the second end, the second intermediate portion having an uninterrupted circular cross section perpendicular to the longitudinal axis, wherein a first diameter of the central portion at a longitudinal midpoint is the same as a second diameter of the first intermediate portion, wherein the bar pin further includes a first flat portion between the first end and the first intermediate portion and a second flat portion between the second end and the central portion;
press-fitting the bar pin into a bushing, the bushing including an inner sleeve, an outer sleeve, and an elastomer disposed between the inner sleeve and the outer sleeve, wherein the inner sleeve circumscribes the central portion of the bar pin and the elastomer includes a bumper; and
positioning the bumper proximate to and spaced apart from the flange.

16. The method of claim 15, further comprising machining the central portion.

17. The method of claim 15, wherein casting the bar pin includes casting the bar pin from austempered ductile cast iron.

* * * * *